United States Patent [19]
Visscher

[11] Patent Number: 6,146,572
[45] Date of Patent: Nov. 14, 2000

[54] METHOD FOR FORMING A SOCKET ON A PIPE OF BIAXIALLY ORIENTED POLYVINYL CHLORIDE

[75] Inventor: Jan Visscher, Lutten, Netherlands

[73] Assignee: Wavin B.V., Netherlands

[21] Appl. No.: 09/150,651

[22] Filed: Sep. 9, 1998

Related U.S. Application Data

[63] Continuation of application No. PCT/NL97/00117, Mar. 10, 1997.

[30] Foreign Application Priority Data

Mar. 13, 1996 [NL] Netherlands ............................ 1002604

[51] Int. Cl.⁷ ............................ B29C 61/02; B29C 61/08; B29C 35/02; B29C 35/10; B29C 35/16
[52] U.S. Cl. ............................ 264/230; 264/235; 264/237; 264/322; 264/327; 264/346; 264/348; 264/481; 264/519; 264/DIG. 65; 425/384; 425/393; 432/18
[58] Field of Search ............................ 264/481, 492, 264/230, 519, 237, 322, 327, 348, 235.6, DIG. 65, 346, 342 RE, 235; 425/384, 393, 403; 432/18

[56] References Cited

U.S. PATENT DOCUMENTS

| | | | |
|---|---|---|---|
| 3,557,278 | 1/1971 | Kuhlemann | 264/322 |
| 3,806,301 | 4/1974 | Osterhagen et al. | 425/393 |
| 4,094,949 | 6/1978 | Yokokawa et al. | 264/234 |
| 4,150,087 | 4/1979 | De Putter et al. | 264/296 |
| 4,255,137 | 3/1981 | Guyer | 432/225 |
| 4,276,010 | 6/1981 | Shartzer | 425/143 |
| 4,847,094 | 7/1989 | Parmann | 425/107 |
| 5,928,451 | 7/1999 | Johnasson et al. | 156/242 |

FOREIGN PATENT DOCUMENTS 9400894  1/1996  Netherlands.

OTHER PUBLICATIONS

International Type Search Report, EPO, Dated Nov. 8, 1996, ISA No. 27289 NL, Patent Application No. 1002604, Country—The Netherlands (NL), Filed Mar. 13, 1996; and Translation thereof.

International Search Report, EPO, Dated Jun. 3, 1997, PCT International Application No. PCT/NL97/00117, Filed Mar. 10, 1997.

*Primary Examiner*—Jan H. Silbaugh
*Assistant Examiner*—Michael I. Poe
*Attorney, Agent, or Firm*—Blank Rome Comisky & McCauley LLP

[57] ABSTRACT

A method for forming a socket on a pipe of biaxially oriented polyvinyl chloride including: placing a support in an end section of the pipe, heating the pipe in the region of the end section; deforming the pipe to produce a socket in the region of the heated end section, the heated end section being supported internally while the socket is being formed; cooling the pipe in the region of the end section, the end section being supported internally during the cooling operation; and removing the support from the pipe. For the purpose of heating the internally supported end section of the pipe, the end section is first heated until the end section has reached, substantially homogeneously, the glass transition temperature of polyvinyl chloride and is then further heated until the end section has reached, substantially homogeneously, a temperature near, preferably just above, the orientation temperature of polyvinyl chloride.

8 Claims, 2 Drawing Sheets

METHOD FOR FORMING A SOCKET ON A PIPE OF BIAXIALLY ORIENTED POLYVINYL CHLORIDE

This is a continuation of International Application No. PCT/NL97/00117 filed Mar. 10, 1987, which was based on the Netherlands Application No. 1002604, filed Mar. 13, 1996.

BACKGROUND OF THE INVENTION

The invention relates to a method for forming a socket on a pipe of biaxially oriented polyvinyl chloride.

Such a method is disclosed by NL-A-9400894. The pipe of biaxially oriented polyvinyl chloride may, for example, have been fabricated by means of the methods as described in WO 95/25627, WO 95/25628 and WO 95/30533.

In the case of the method disclosed by NL-A-9400894, and end section of the pipe on which the socket is to be formed, is slipped onto a support section of a mandrel, which support section fits into the pipe. Then the internally supported pipe end section is heated, whereupon a socket-forming mandrel section which adjoins the support section and whose shape substantially corresponds to the intended shape of the socket is formed into the heated end section of the pipe. Finally, the pipe end section still supported by the mandrel is cooled.

It was found that in the case of pipes on which sockets had been formed by means of the known method, cracking occurred in a large number of cases in the socket section of the pipes. These cracks sometimes occurred even while the sockets were being formed, but also if the sockets were subsequently subjected to an impact load.

OBJECTS AND SUMMARY OF THE INVENTION

It is an object of the present invention to provide a method which will afford sockets of better quality.

The present invention provides a method, which is characterized in that, for the purpose of heating the internally supported end section of the pipe, said end section is first heated until said end section has reached, substantially homogeneously, the glass transition temperature of polyvinyl chloride and is then further heated until the end section has reached, substantially homogeneously, a temperature near, preferably just above, the orientation temperature of polyvinyl chloride.

In other words, the invention therefore proposes that the relevant internally supported end section of the pipe be heated in at least two steps: first to about the glass transition temperature of polyvinyl chloride, which is at 80–85° C., said heating being maintained for a sufficiently long period to ensure that the end section, as seen across the wall thickness, virtually uniformly is at this temperature, and in one or more subsequent steps to a higher temperature which is in the vicinity of the orientation temperature, which is about 110° C., and preferably to a value somewhat above the orientation temperature, for example to about 120° C.

Preferably, the heating of the pipe in the region of the end section comprises the external heating of the pipe and/or the heating of the support.

The heating means may comprise a heating ring, for example including an infrared radiator, which is situated around the support section of the mandrel, if this has first been inserted into the pipe. The heat output of such a heating ring to the pipe can be controlled in a simple and accurate manner.

BRIEF DESCRIPTION OF THE DRAWINGS

The invention will be explained hereinafter in more detail with reference to the drawing, in which.

DETAILED DESCRIPTION OF THE PREFERRED EMBODIMENT

The following description starts from a previously fabricated pipe of biaxially oriented polyvinyl chloride having a smooth, cylindrical wall, which is to be provided with a socket.

Figure 1:
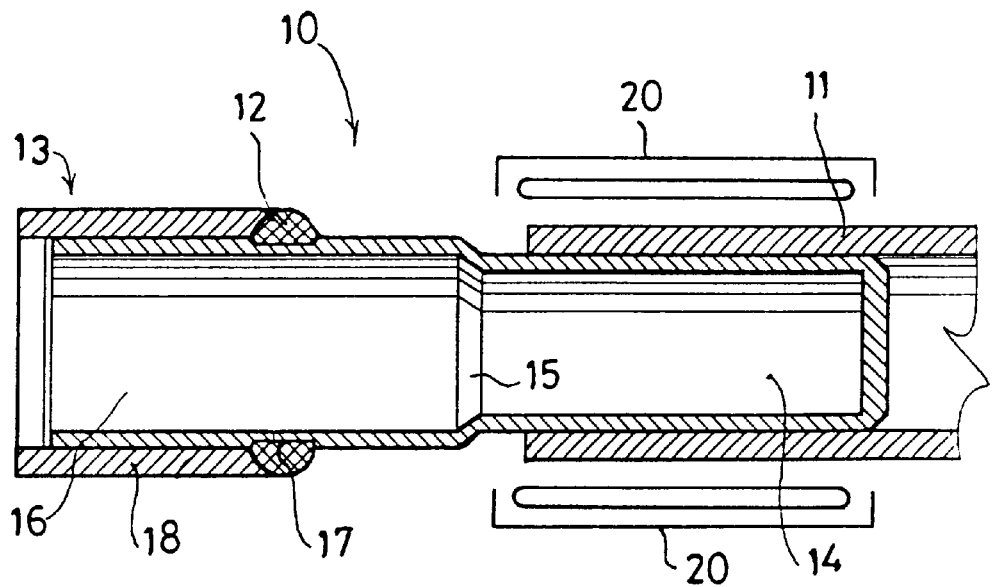
FIG. 1 shows a schematic longitudinal section of an illustrative embodiment of an apparatus for forming a socket on a biaxially oriented pipe during the initial phase of the method according to the invention.
Figure 2:
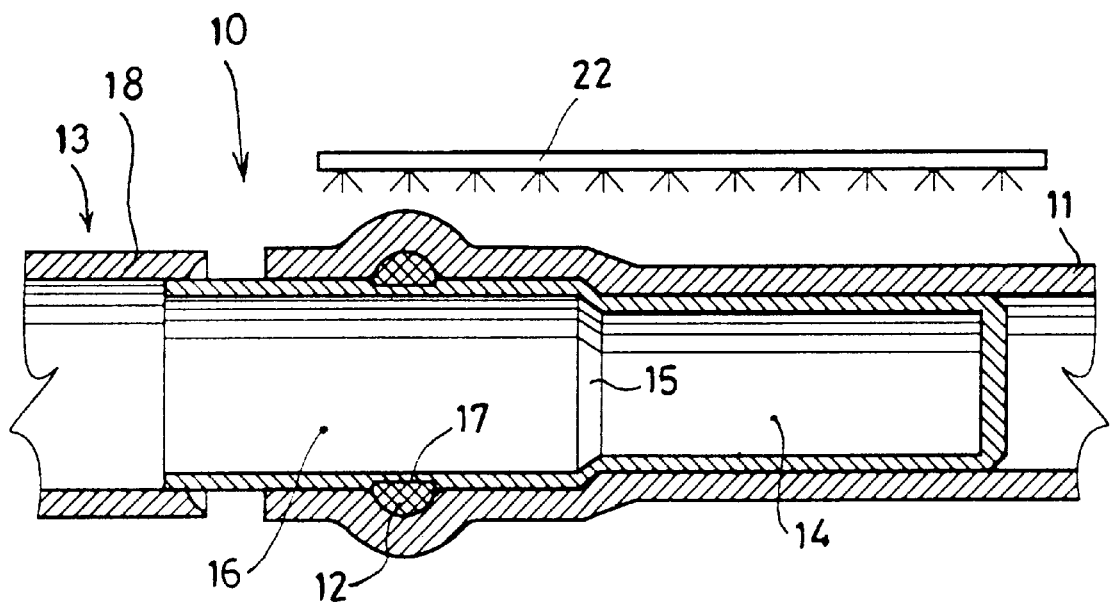
FIG. 2 shows a view corresponding to FIG. 1 during the end phase of the method according to the invention.

The apparatus 10 shown in FIGS. 1 and 2 enables a socket to be formed on a biaxially oriented pipe 11, the socket being provided directly with an elastic sealing ring 12.

The apparatus 10 comprises a hollow cylindrical mandrel 13 which is open at one end. The mandrel 13 has a support section 14, a transition section 15 and a socket-forming section 16. The socket-forming section 16 is provided with a circumferential groove 17 on the outside. The apparatus 10 further comprises a support ring 18 which can slide over the socket-forming section 16. For the purpose of heating and subsequent cooling of the end section of the pipe 11 to be processed, the apparatus comprises a heating device 20 and a cooling device 22.

The fabrication of a socket with sealing ring by means of the apparatus shown in FIGS. 1 and 2 proceeds as follows. First the sealing ring 12 is pushed over the mandrel 13 unit it comes to lie in the relatively shallow groove 17. The support ring 18 bears against that side of the sealing ring 12 which faces away from the insertion side of the mandrel 13. Then the support section 14 is inserted, for example by a double-acting hydraulic cylinder (not shown), into the end section of the pipe 11.

When the end section of the pipe 11 is supported internally by the support section 14 of the mandrel 13, said pipe end section is heated by means of the heating device 20. If required it is possible, via the support section 14 of the mandrel 13, to effect internal heating of the end section of the pipe 11. The internal support by the support section 14 prevents shrinkage, in a radial direction, of the pipe 11 whose plastic material, under the influence of the heating, is trying to revert to the state of the plastic material prior to being oriented biaxially. Some shrinkage in the heated end section does occur in the axial direction. This axial shrinkage of the end section is advantageous, however, because it is thus possible to compensate for the wall becoming thinner in the socket region as a result of the radial expansion yet to be effected.

When the end section of the pipe 11 has been suitably heated, the mandrel 13 is pushed further into the pipe 11. At the moment when the sealing ring 12 comes up against the pipe 11, the pipe 11 will be further expanded by the sealing ring 12. The sealing ring 12 is supported, in the process, by the support ring 18 which moves in tandem with the mandrel 13. As a result, the pipe 11 slides over the sealing ring 12 and subsequently over the support ring 18 situated behind it. As soon as the intended position of the socket-forming section 16 in the tube 11 has been reached, the support ring 18 is drawn backwards out of the pipe 11, by means which are likwise not shown, to the position shown in FIG. 2. Because the biaxially oriented pipe 11 is still warm and therefore has a tendency to shrink in a radial direction, the pipe 11 automatically comes to lie, in the state shown in FIG. 2, against the socket-forming section 16 and then traps the sealing ring 12. Then the end section, still internally supported, of the pipe 11 can be cooled by means of the cooling device 22 and/or by the cooling the mandrel 13. Finally, the mandrel 13 can be pulled from the pipe 11 in its entirety, the sealing ring 12 disengaging from the shallow groove 17 of the mandrel 13 and remaining behind in the socket formed.

Figure 3:
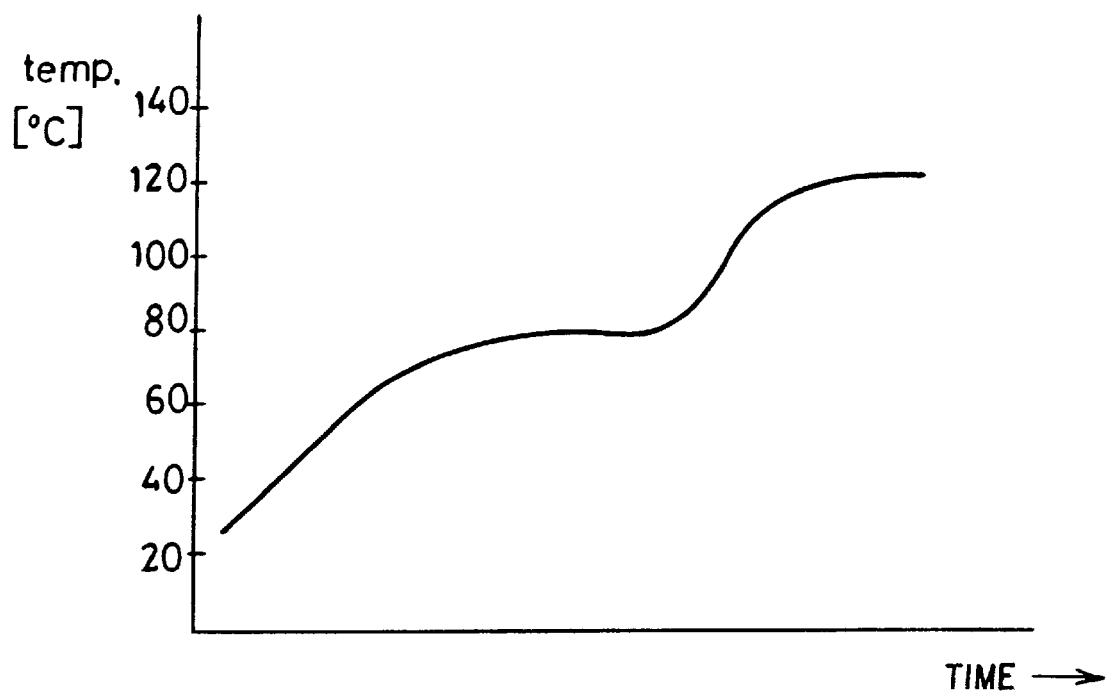
FIG. 3 shows the variation with time of the temperature of the internally supported end section of the pipe during the heating operation in the manner according to the invention.

The present invention provides for a special manner of heating the end section, internally supported by the support section 14, of the pipe 11. The variation in temperature against time, as preferentially aimed for, of the end section of the pipe 11 is shown in FIG. 3. In the first instance, the heating device 20 is set so as to reach an end section temperature which roughly corresponds to the glass transition temperature of polyvinyl chloride (about 80–85° C.). This setting of the heating device 20 is maintained for some time, to ensure that the end section of the pipe 11 is at this temperature as uniformly as possible. Only when it can be assumed that this is the case is the heating device 20 set so as to heat the end section of the pipe 11 to a higher temperature. The temperature ultimately to be reached for the end section of the pipe 11 preferably roughly corresponds, according to the invention, to the orientation temperature of polyvinyl chloride (about 110° C.), preferably slightly above, for example 120° C.

For that matter, once the end section of the pipe 11 has been heated uniformly to the glass transition temperature, it is important, when the end section is heated to a higher temperature, that the temperature differences in the wall of the end section of the pipe 11 be kept within limits. This can be done by the end section being heated stepwise, so that the end section will first uniformly have reached a particular temperature and will only then be heated further once more. Thus it is even possible for the end section to be heated to a higher temperature than is preferable according to the invention, for example to about 135–140° C. If the end section were to be heated in one step from the glass transition temperature to such a high temperature, the probability of cracking is high.

Although the mechanism involved is not entirely clear, the abovedescribed manner of heating is found to avoid the inception of undesirable stresses in the socket, which lead to cracking.

It is evident that in the process of forming the socket by the method according to the present invention, other mandrel designs may alternatively be used. One possibility, for example, is that of a radially expandable mandrel. Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method for forming a socket on a pipe of biaxially oriented polyvinyl chloride having an open end section comprising the steps of:

inserting a support into the open end section of said pipe;

initially heating said end section while internally supported by said support until said end section has been substantially homogeneously heated to the glass transition temperature of polyvinylchloride, the internal support preventing shrinkage of said end section in a radial direction and some shrinkage of said end section occurring in an axial direction;

further heating said initially heated end section while internally supported by said support until said end section has been substantially homogeneously heated to a temperature near the orientation temperature of polyvinyl chloride;

deforming said further heated end section to form said socket in said further heated end section of said pipe;

cooling said deformed end section, said deformed end section being internally supported during cooling; and removing said support from said cooled end section;

whereby the inception of undesirable stresses which lead to cracking in said socket is avoided.

2. The method of claim 1, wherein said further heating step is carried out until said end section reaches a substantially homogeneous temperature above the orientation temperature of said polyvinylchloride.

3. The method of claim 1, wherein said initial heating step is carried out at a temperature range of about 80–85° C.

4. The method of claim 1, wherein said further heating step is carried out at a temperature range of about 110–140° C.

5. The method of claim 1, wherein said support is a mandrel.

6. The method of claim 5, wherein said mandrel includes a support section for internally supporting said end section of said pipe, a transition section and a socket-forming section whose shape substantially corresponds to the intended shape of said socket, wherein said transition section is located between said support section and said socket-forming section.

7. The method of claim 6, wherein said socket-forming section includes a circumferential groove for receiving a sealing ring.

8. The method of claim 7, wherein said sealing ring is disengaged from said circumferential groove of said socket-forming section and remains behind in said socket formed after said support is removed.

* * * * *